C. WILLIAMS.
Bee Hive.
No. 29,848.
Patented Aug. 28, 1860.
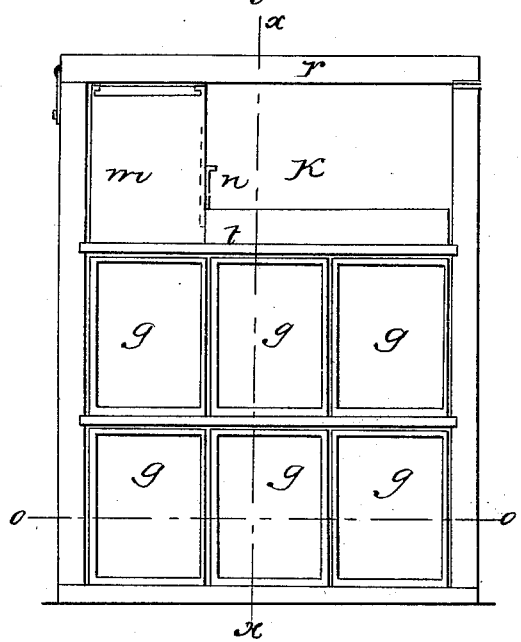
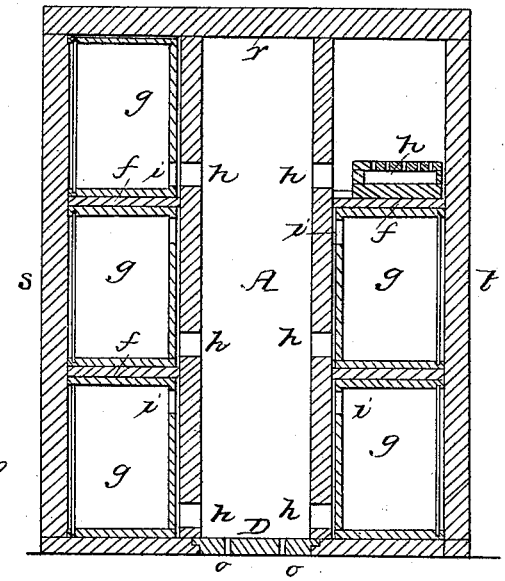
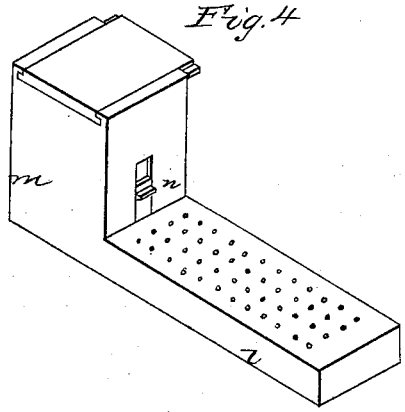
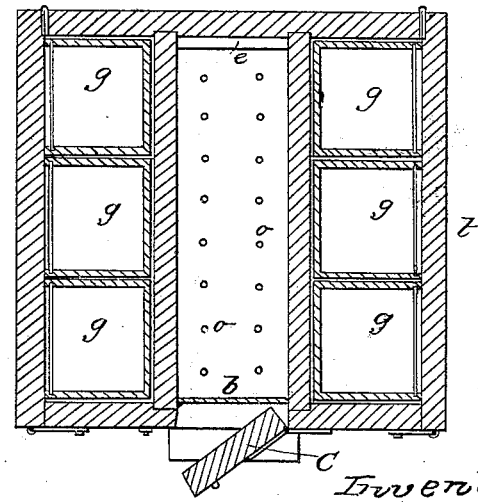
Witnesses
F. H. Lewis
L. M. Lamm
Inventor
C. Williams.

UNITED STATES PATENT OFFICE.

C. WILLIAMS, OF WESTON, MISSOURI, ASSIGNOR TO HIMSELF AND J. F. DEFFENBACHER, OF SAME PLACE.

BEEHIVE.

Specification of Letters Patent No. 29,848, dated August 28, 1860.

*To all whom it may concern:*

Be it known that I, CHAS. WILLIAMS, of Weston, in Platte county and State of Missouri, have invented certain new and useful Improvements in Beehives; and I do hereby declare that the following is a full, clear, and exact description thereof, reference being had to the accompanying drawing, through letters of reference marked thereon, forming part of this specification, and in which—

Figure 1 represents an elevation on the feeder side, the side-door being removed. Fig. 2, a vertical transverse section, on the line $x\ x$ of Fig. 1; Fig. 3, a horizontal section, on the line $o, o$, of Fig. 1, and Fig. 4, an isometrical perspective view of the feeder, detached.

The same letters of reference appearing in the several figures indicate the same parts.

The main body of my hive is divided into three principal compartments vertically and extending from front to rear, the center one of which (marked A) I denominate the "home department" which is provided with a glass end ($b$) in front, and a shutter (C) to darken the same; its bottom consists of a slide (D) extending from front to rear, the whole width of the compartment, which is drawn out more or less at the front, leaving a space ($e$) at the rear just large enough for the bees to go in and out at; and during the winter when they can gather no honey, or when the weather is too cold for them to go out without loss of life, or should it be desirable to move the hive from one locality to another the space ($e$) may be closed entirely by pushing in the slide (D); this slide is perforated with a series of holes ($o$) for ventilation, so that when the hive is closed as above described, it is amply supplied with fresh air.

The side compartments are each fitted with two horizontal shelves ($f$) dividing them into three equal parts; on these shelves I place a series of boxes ($g$) the front of each of which is made of glass for the convenience of examining their contents, and the whole side is darkened by a shutter ($t$); the side walls of the middle or home department have a series of holes ($h$) just above each shelf, and opposite to a corresponding hole ($i$) in the back of each box ($g$), near the bottom, for the passage of the bees into them; until it is desirable to admit the bees into the several boxes, they (the boxes) are placed upside down on the shelf, so that the two holes are not opposite to each other, consequently there is no passage for them; in this manner they may be admitted to or excluded from any one or more boxes at pleasure.

The upper shelf on one side of the hive is appropriated as a feed department ($k$) and is fitted with a feed box ($l$), one end of which forms a fountain reservoir ($m$), with an air tight cover, for the food, which is let down in any desired quantity, by adjusting the slide ($n$), into a trough ($p$) covered with a perforated top through which the bees take their food; in which manner it is impossible for them to get gummed (as apiarists term it) which results in their being turned out of the hive or killed, for they will not allow a dirty bee to remain with them.

The top ($r$) and two sides ($s, t,$) are hinged and have suitable fastenings for the convenience of examining the cells and feed chamber.

The advantages of this hive over all others are, first, that the home department is perfectly isolated, from the severity of the weather in the winter, and excessive heat in the summer; secondly, that the construction of the feeder is such that it is impossible for the bees to get into the food, to get gummed or drowned; and thirdly that a good supply of food may be put in at once, which flows down gradually without overflowing the feed trough.

Having thus described my invention what I claim as new and desire to secure by Letters Patent is—

Constructing the feed apparatus so that a uniform quantity of food will always flow into the trough, said trough having a perforated cover for the bees to feed through in the manner and for the purposes set forth.

In testimony whereof I have hereunto set my hand this 30th day of January A. D. 1860, before two subscribing witnesses.

C. WILLIAMS.

Witnesses:
L. M. LAURIN,
F. H. SIMS.